United States Patent
Yamamoto

(10) Patent No.: US 8,581,984 B2
(45) Date of Patent: Nov. 12, 2013

(54) VEHICLE CIRCUMFERENCE MONITOR APPARATUS

(75) Inventor: Toshiaki Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 409 days.

(21) Appl. No.: 12/926,969

(22) Filed: Dec. 21, 2010

(65) Prior Publication Data

US 2011/0181723 A1 Jul. 28, 2011

(30) Foreign Application Priority Data

Jan. 25, 2010 (JP) ................................. 2010-013276

(51) Int. Cl.
*H04N 7/18* (2006.01)
(52) U.S. Cl.
USPC ........................................................ 348/148
(58) Field of Classification Search
USPC ........................................................ 348/148
See application file for complete search history.

(56) References Cited

U.S. PATENT DOCUMENTS

| | | | | |
|---|---|---|---|---|
| 5,486,853 | A * | 1/1996 | Baxter et al. | 348/222.1 |
| 6,304,173 | B2 * | 10/2001 | Pala et al. | 340/461 |
| 2005/0212970 | A1 * | 9/2005 | Joskin | 348/572 |
| 2006/0114272 | A1 | 6/2006 | Taniguchi et al. | |
| 2007/0106440 | A1 * | 5/2007 | Oki et al. | 701/36 |
| 2009/0185720 | A1 * | 7/2009 | Kurpinski et al. | 382/106 |

FOREIGN PATENT DOCUMENTS

| | | |
|---|---|---|
| JP | A-H4-81091 | 3/1992 |
| JP | A-2000-222048 | 8/2000 |
| JP | A-2001-6097 | 1/2001 |
| JP | A-2001-148849 | 5/2001 |
| JP | A-2003-81014 | 3/2003 |
| JP | A-2004-147190 | 5/2004 |
| JP | A-2005-35542 | 2/2005 |
| JP | A-2007-323495 | 12/2007 |

OTHER PUBLICATIONS

Office Action mailed Nov. 13, 2012 in corresponding Japanese Application No. 2010-13276 (and English translation).

* cited by examiner

*Primary Examiner* — David Czekaj
*Assistant Examiner* — Tracy Li
(74) *Attorney, Agent, or Firm* — Posz Law Group, PLC

(57) ABSTRACT

An analog-state video signal is inputted from each of several in-vehicle cameras via a corresponding signal cable. An amendment amount for making uniform signal levels of the analog-state video signals originating from the respective in-vehicle cameras is determined, with respect to each of the analog-state video signals, based on a burst signal included in each analog-state video signal. According to the determined amendment amounts, the analog-state video signals are amplified to make uniform the signal levels, obtaining analog-state uniformed video signals, respectively. A composite image of combining images originating from the in-vehicle cameras is generated based on the obtained analog-state uniformed video signals.

18 Claims, 7 Drawing Sheets

COMPARATIVE

VEHICLE CIRCUMFERENCE MONITOR APPARATUS

CROSS REFERENCE TO RELATED APPLICATION

The present application is based on and incorporates herein by reference Japanese Patent Application No. 2010-13276 filed on Jan. 25, 2010.

FIELD OF THE INVENTION

The present invention relates to a The present invention relates to a vehicle circumference monitor apparatus.

BACKGROUND OF THE INVENTION

[Patent document 1] JP-2003-81014 A
[Patent document 2] JP-2005-35542 A

There is conventionally known a technology to display a captured image of a circumference outside of a vehicle, thereby eliminating a dead angle of the vehicle to help prevent a collision. For example, Patent document 1 discloses a technology to capture an image to cover all angles of a circumferential area at the rear of the vehicle using a rear monitor camera, thereby enabling the recognition of the dead angle which cannot be confirmed by a vehicle mirror.

In addition, there is recently known a technology to use a bird's-eye view image as an effective means to make it easy to understand positional relation between a vehicle and an obstacle, thereby helping prevent an accidental contact. For example, Patent document 2 discloses a technology to display a bird's-eye view image which illustrates an omnidirectional circumference state outside of the vehicle viewed from a viewpoint above the vehicle, thereby making it easy to understand positional relation between the vehicle and the obstacle.

In order to display a bird's-eye view image which illustrates a circumference state of all the directions or areas surrounding the vehicle, a general technology is used as follows. That is, several cameras are installed in the vehicle so as to capture images of several circumferential areas. Such captured images by the cameras are inputted into an electronic control unit (ECU) to undergo a bird's-eye view transformation; the cameras' images having undergone the bird's-eye view transformation are combined to generate a single bird's-eye view composite image.

It is noted that the longer a cable connecting the camera with the ECU is, the more an analog signal from the camera to the ECU attenuates. Thus, a video signal is attenuated more with respect to a camera having a longer cable connecting with the ECU. As a result, an image originating from a camera having the longer cable is faded more in color definition. Further, suppose the case that the several images originating from the cameras having the cables with much mutually different lengths are combined to thereby generate or synthesize a single composite image. In such a case, the originating images are different from each other in the color definition; thus, an appearance of the synthesized single composite image is degraded to reduce a commodity value, posing a disadvantage.

It is noted that such a disadvantage arises more significantly as the size of the vehicle becomes larger to cause the installation positions of the cameras to be separated farther from each other. Therefore, in particular, such a disadvantage arises remarkably with respect to a large-sized vehicle such as a track and a bus.

In addition, a countermeasure to prevent the occurrence of the disadvantage may be adopted which applies A/D conversion to the images captured by the cameras and then transmits resultant digital video signals of the several cameras to the ECU via the corresponding signal cables. In this regard, however, such a countermeasure requires each of the cameras or camera units to have a function to execute the A/D conversion. This poses the cost increase and another disadvantage to make it difficult to reduce the size of each camera or camera unit.

SUMMARY OF THE INVENTION

The present invention is made in view of the above disadvantage. It is an object to provide a vehicle circumference monitor apparatus helping prevent deterioration of an appearance of an image synthesized using several images originating from several in-vehicle cameras and enhancing a commodity value while reducing costs and the size of each in-vehicle camera.

To achieve the above object, according to an example of the present invention, a vehicle circumference monitor apparatus in a vehicle provided as follows. A plurality of in-vehicle cameras are arranged such that at least a part of a capture target of one in-vehicle camera does not overlap with a capture target of an other camera. Each of the in-vehicle cameras captures an image of a vehicle circumferential area outside of the vehicle and outputs an analog-state video signal of the captured image via a corresponding signal cable. An electronic control unit is included to have an image combination section to generate a composite image by a combination to combine images originating from the in-vehicle cameras based on video signals inputted via the signal cables from the in-vehicle cameras. A display device is included to display the composite image generated by the image combination section. Herein, the electronic control unit further includes an amendment amount determination section to determine an amendment amount with respect to the analog-state video signal originating from each of the in-vehicle cameras based on analog signals included in the analog-state video signals inputted via the signal cables from the in-vehicle cameras, in order to make uniform signal levels of the analog-state video signals originating from the respective in-vehicle cameras.

Under the above configuration, based on analog signals inputted via the signal cables from several in-vehicle cameras, in order to make uniform the signal levels of the analog-state video signals originating from respective in-vehicle cameras, an amendment amount is determined with respect to each analog-state video signal originating from each in-vehicle camera. It is noted that the video signal inputted via the corresponding cable from the in-vehicle camera is in an analog state; the analog-state video signal has a high possibility to exhibit a tendency of the same attenuation as an analog signal inputted via the signal cable from the in-vehicle camera. That is, the attenuation of the analog-state video signal can be estimated based on the degree of the attenuation of the analog signal. Thus, based on the analog signal, the amendment amount for making uniform the signal levels of the analog-state video signals originating from the in-vehicle cameras can be determined with sufficient accuracy.

Under the above configuration, based on the determined amendment amount, the amendment about each video signal originating from each in-vehicle camera is executed to make uniform the signal levels originating from the in-vehicle cameras. This enables the combined image that is formed by combining images originating from the several in-vehicle cameras to be displayed in a state where deterioration of the appearance due to the difference in color definition is suppressed.

Further, in the above configuration, while outputting the video signals in the analog state to the electronic control unit from the in-vehicle cameras, it becomes possible to solve the disadvantage of the difference in definition of the images, which originate from the several in-vehicle cameras and arise from the variation in attenuation of the video signals resulting from the difference in length of the corresponding signal cables which send the analog-state video signals. Under the above configuration, as compared with the configuration which provides each in-vehicle camera with a component to execute the A/D conversion, costs in the whole apparatus can be reduced and the miniaturization of the in-vehicle camera or camera unit can be made easier.

As a result, while reducing the cost and making easier the miniaturization of the in-vehicle camera, the deterioration of the appearance of the composite image formed by combining the images originating from the several in-vehicle cameras can be suppressed, thereby increasing the commodity value.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
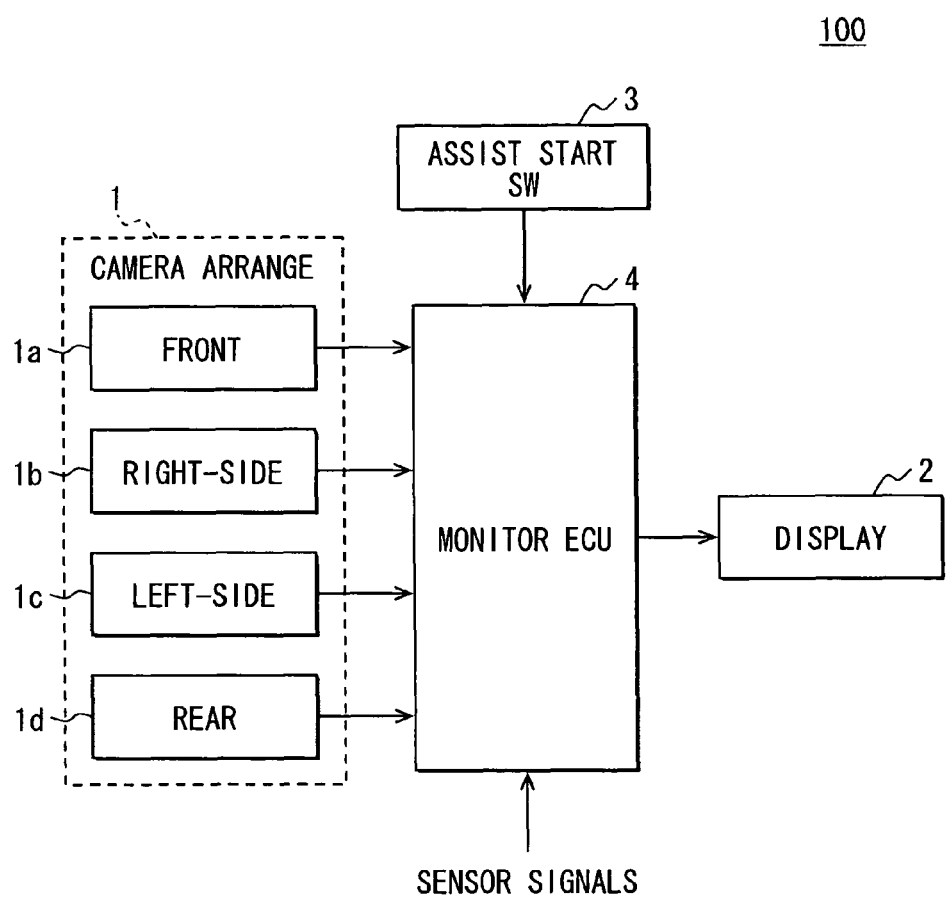
FIG. 1 is a block diagram illustrating a configuration of a vehicle circumference monitor apparatus according to an embodiment of the present invention.

An embodiment of the present invention is explained with reference to drawings. FIG. 1 is a block diagram illustrating an overall configuration of a vehicle circumference monitor apparatus 100 according to an embodiment of the present invention. The vehicle circumference monitor apparatus 100 illustrated in FIG. 1 is mounted in a subject vehicle. The vehicle circumference monitor apparatus 100 includes several in-vehicle cameras 1a to 1d (four cameras in FIG. 1), a display device 2, an assist start switch 3, and a circumference monitor ECU (electronic control unit) 4. Further, the cameras 1a to 1d are collectively referred to as a cameras arrangement 1. The present embodiment is explained with reference to an example case that the vehicle circumference monitor apparatus 100 is mounted in a track defined as a large-sized vehicle larger than a standard-sized vehicle.

The cameras 1a to 1d are arranged such that at least a part of a capture target of one camera does not overlap with another capture target of another camera; the cameras 1a to 1d capture images in different circumferential areas outside of the vehicle, respectively. In addition, each of the cameras 1a to 1d has a wide-angle lens and an imaging element such as a CCD element. The imaging element receives a light via the wide-angle lens. The received light is transformed into an analog video signal (i.e., an analog-state video signal). In the present embodiment, the cameras 1a to 1d are color cameras of NTSC system. In addition, the cameras 1a to 1d can use a well-known CCD camera, for example.

Figure 2:
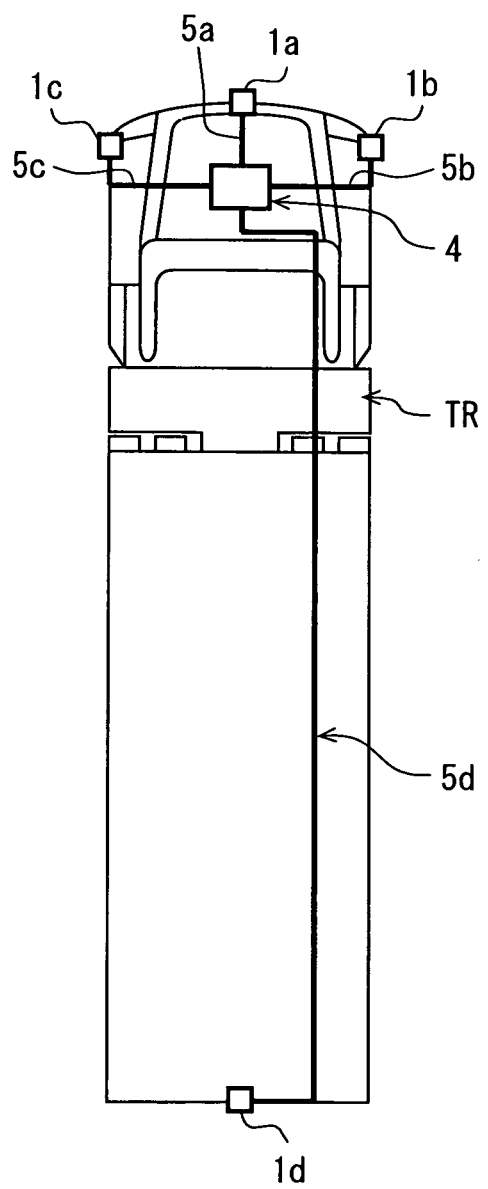
FIG. 2 is a schematic view illustrating an installation state of cameras in a track.

The following explains an installation state or attachment state, in which the cameras 1a to 1d are installed or attached to the track, with reference to FIG. 2, which is a schematic view illustrating the installation state of the cameras 1a to 1d in the track. In addition, TR of FIG. 2 indicates a vehicle body of the track.

First, a front camera 1a is arranged in a front portion of the track, as illustrated in FIG. 2. In detail, the front camera 1a is arranged such that an optic axis is directed at a road surface ahead of the vehicle, i.e., in a vehicle forward direction. The front camera 1a captures an image of a circumferential area which spreads in a predetermined angle range in the vehicle forward direction. In addition, a right side camera 1b is arranged on a right side portion of the track, as illustrated in FIG. 2. In detail, the right side camera 1b is arranged such that an optic axis is directed at a road surface rightward of the vehicle (i.e., in a right side of the vehicle). The right side camera 1b captures an image of a circumferential area which spreads in a predetermined angle range in the vehicle rightward direction. In addition, a left side camera 1c is arranged on a left side portion of the track, as illustrated in FIG. 2. In detail, the left side camera 1c is arranged such that an optic axis is directed at a road surface leftward of the vehicle (in a left side of the vehicle). The left side camera 1c captures an image of a circumferential area which spreads in a predetermined angle range in the vehicle leftward direction. In addition, a rear camera 1d is arranged on a rear portion of the track, as illustrated in FIG. 2. In detail, the rear camera 1d is arranged such that an optic axis is directed at a road surface rearward of the vehicle (i.e., in a rear of the vehicle). The rear camera 1d captures an image of a circumferential area which spreads in a predetermined angle range in the vehicle rearward direction.

The cameras 1a to 1d are arranged such that captured images overlap with one another at edge portions. In other words, an edge portion of the region image-captured by the front camera 1a overlaps with an edge portion of the region image-captured by the right side camera 1b; an edge portion of the region image-captured by the front camera 1a overlaps with an edge portion of the region image-captured by the left side camera 1c; an edge portion of the region image-captured by the right side camera 1b overlaps with an edge portion of the region image-captured by the rear camera 1d; and an edge portion of the region image-captured by the left side camera 1c overlaps with an edge portion of the region image-captured by the rear camera 1d.

Each image captured by each camera is referred to as follows: an image by the front camera 1a is a front image; an image by the right side camera 1b is a right side image; an image by the left side camera 1c is a left side image; an image by the rear camera 1d is a rear image.

In addition, the right side camera 1b may be arranged such that an optic axis is directed at a road surface in a circumferential area, which is located on a rear portion of a right side of the vehicle to capture an image of a circumferential area which spreads in a predetermined angle range in the rear portion of the right side of the vehicle. In contrast, the left side camera 1c may be arranged such that an optic axis is directed at a road surface in a circumferential area, which is located on a rear portion of a left side of the vehicle. to capture an image of a circumferential area which spreads in a predetermined angle range in the rear portion of the left side of the vehicle.

Each of the cameras 1a to 1d outputs an analog video signal, which is acquired by transforming using the imaging element, to the circumference monitor ECU 4 via signal cables 5a to 5d. That is, the cameras 1a to 1d output, in the analog state, the video signals of the captured images to the circumference monitor ECU 4 via the corresponding signal cables 5a to 5d. Thus, the video signal in the analog state may be referred to as an analog-state video signal.

In addition, it is premised that at least one of the signal cables 5a to 5d connecting the cameras 1a to 1d with the circumference monitor ECU 4 is different from others. With respect to the body of the vehicle, the length in the forth and back direction is greater than that in the right and left direction. Even if the installation position of the circumference monitor ECU 4 is considered in the various manners, the deviation in length arises naturally among the signal cables 5a to 5d connecting with the cameras 1a to 1d, which are arranged in different four sides of the vehicle. The tendency to cause such a deviation in length among the signal cables 5a to 5d is intensified as the size of the vehicle becomes large like a track illustrated in FIG. 2. The following explains the case where the length of the signal cable 5d which connects the circumference monitor ECU 4 with the rear camera 1d is significantly long as compared with the lengths of the three signal cables 5a to 5c which connect the circumference monitor ECU 4 with the cameras 1a, 1b, and 1c, respectively, as illustrated in FIG. 2.

Returning to FIG. 1, the display device 2 is arranged in a predetermined position (for example, on a dashboard, or on a surface of an instrument panel) of the vehicle compartment of the track so that it can be seen from a driver of the track. The display device 2 displays an image inputted from the circumference monitor ECU 4 in an image display window. For example, the display device 2 enables a full color display and may use a liquid crystal display, an organic electroluminescence display, a plasma display, or the like. Further, the display device 2 may be included in a display unit of an in-vehicle navigation apparatus.

The assist start switch 3 is a switch, which is manipulated in order that the occupant of the subject vehicle may order the start of a circumference monitor control. The ON and OFF manipulation of the assist start switch 3 causes the circumference monitor ECU 4 to start and stop the circumference monitor control, respectively. Such a circumference monitor control is relative to a process including (i) transforming images captured by the cameras 1a to 1d into bird's-eye view images; (ii) combining the several bird's-eye view images to generate or synthesize a composite image, and (iii) displaying the generated composite image in the display device 2. A hazard switch or a winker switch may be used as the assist start switch 3, for instance.

The circumference monitor ECU 4 includes mainly a microcomputer having a CPU, ROM, RAM, and backup RAM. The circumference monitor ECU 4 executes various kinds of control programs stored in the ROM based on the variety of information inputted from the cameras 1a to 1d and the assist start switch 3, so as to execute various kinds of processes including the circumference monitor control. It is noted that the circumference monitor ECU 4 may by referred to as an electronic control unit.

In addition, the circumference monitor ECU 4 may be configured to receive a sensor signal from each of the various sensors, for instance, as follows: a sensor signal indicating a shift position from a shift position sensor; a sensor signal indicating a steering angle from a steering sensor; a sensor signal indicating a velocity of the vehicle from a vehicle velocity sensor; a sensor signal indicating a velocity of the vehicle from a vehicle wheel velocity sensor; and a sensor signal indicating a yaw rate from a yaw rate sensor.

Figure 3:
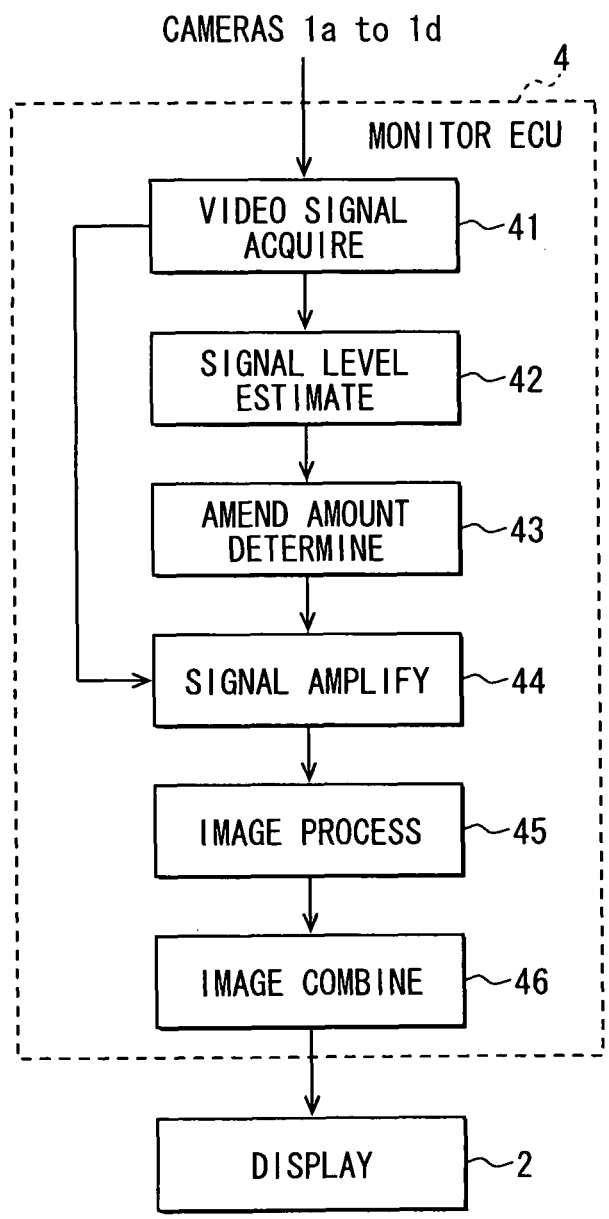
FIG. 3 is a block diagram illustrating a configuration of a circumference monitor ECU.

The following explains an outline configuration of the circumference monitor ECU 4 with reference to FIG. 3. FIG. 3 is a block diagram illustrating a configuration of the circumference monitor ECU 4. As illustrated in FIG. 3, the circumference monitor ECU 4 includes a video signal acquisition section 41, a signal level estimation section 42, an amendment amount determination section 43, a signal amplification section 44, an image processing section 45, and an image combination section 46.

The video signal acquisition section 41 acquires the analog video signals inputted via the signal cables 5a to 5d from the cameras 1a to 1d. Hereinafter, an analog video signal originating from the front camera 1a is referred to as a video signal A; an analog video signal originating from the right side camera 1b is referred to as a video signal B; an analog video signal originating from the left side camera 1c is referred to as a video signal C; and an analog video signal originating from the rear camera 1d is referred to as a video signal D.

Figure 4:
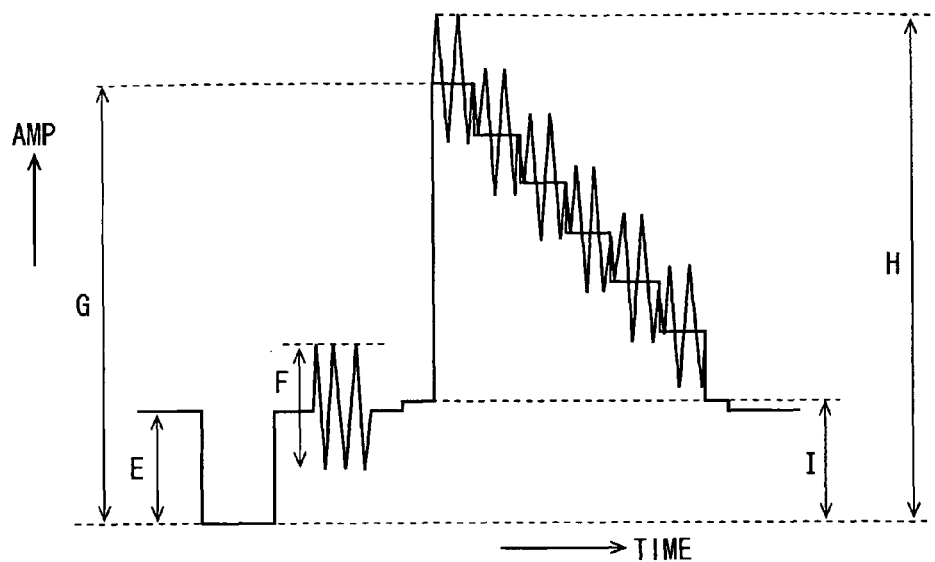
FIG. 4 is a diagram illustrating a waveform of an analog video signal.

Explanation about the analog video signal is given using FIG. 4. FIG. 4 is a diagram illustrating a waveform of an analog video signal. In the present embodiment, the cameras 1a to 1d use color cameras of NTSC system; an analog video signal includes (i) a waveform of a brightness signal and color signal as a signal representing video information (i.e., a signal representing an image), and (ii) a waveform of a synchronization signal and burst signal (i.e., color burst signal) in a blanking period preceding the signal representing video information. In FIG. 4, E represents an amplitude of the synchronization signal, F represents an amplitude of the burst signal, G represents a maximum amplitude of a brightness signal, H represents a maximum amplitude of a color signal, and I represents a black level.

Returning to FIG. 3. The signal level estimation section 42 compares amplitude values (signal amplitude levels) of the burst signals of the video signals A to D acquired in the video signal acquisition section 41. As the result of such comparison, the greatest amplitude value of the burst signal is defined as a reference value (i.e., reference level); a difference is calculated between the amplitude value of each of the burst signals of the video signals A to D and the reference value. The calculated difference is estimated as a difference of the signal level of each video signal A to D. Therefore, the signal level estimation section 42 may be referred to as a level estimation section. It is noted that the amplitude value of the burst signal of the video signal used as the reference value may be not subjected to the calculation of the difference, or regarded as zero (0), thereby allowing the estimation that the relevant video signal has no difference in signal level. In addition, the amplitude value of the burst signal may adopt either a total amplitude value or a half amplitude value.

In addition, each of the video signals A to D is in the state of an analog signal; it has a tendency in attenuation equivalent to that of its own burst signal with a high possibility. Thus, based on the degree of the attenuation of the corresponding burst signal of each of the video signals A to D, the attenuation of each video signal A to D can be estimated with sufficient accuracy.

In the present embodiment, the reference value is assigned to the greatest amplitude value of the burst signal among the amplitude values of the burst signals in the video signals A to D; a difference is calculated between the amplitude value of each of the burst signals of the video signals A to D and the reference value. However, there is no need to be limited thereto. For, example, based on a predetermined reference value, a difference may be calculated between the amplitude value of each of the burst signals of the video signals A to D and the reference value. Such a predetermined reference value may be assigned to a value which is estimated to be greater than any amplitude value of the burst signal of each video signal A to D such as an amplitude value prior to the occurrence of the attenuation in signal level due to passage of the corresponding signal cable 5.

The amount determination section 43 determines an amendment amount of each of the analog-state video signals A to D based on the difference in signal level of the video signal A to D estimated in the signal level estimation section 42. In detail, the amendment amount is determined such that the video signals A to D are amplified by the same as the differences of the amplitude values of the burst signals of the video signals A to D from the above-mentioned reference value. With respect to the video signal originating from the same camera as the camera from which the burst signal assigned to the reference value originates, the amendment is unnecessary; thus, the amendment amount may be undetermined or determined to be zero (0).

Further, in the present embodiment, the amendment amount is determined such that the video signals A to D are amplified by the same as the differences of the amplitude values of the burst signals of the video signals A to D from the above-mentioned reference value. However, there is no need to be limited thereto. For instance, as long as the amendment amount is determined to make uniform the differences, the amendment amount may be determined so as to amplify the video signals A to D more than the corresponding differences.

The signal amplification section 44 has an amplifier (AMP), for example. The signal amplification section 44 amplifies the video signals A to D acquired in the video signal acquisition section 41 according to the amendment amounts determined in the amendment amount determination section 43, and makes uniform the signal levels of the video signals A to D. Thus, the signal amplification section 44 may be referred to as a unit-side amplification section. With respect to the video signal originating from the same camera as the camera from which the burst signal assigned to the reference value originates, the amendment may be not made or the amendment amount is determined to be zero (0).

Figure 5:
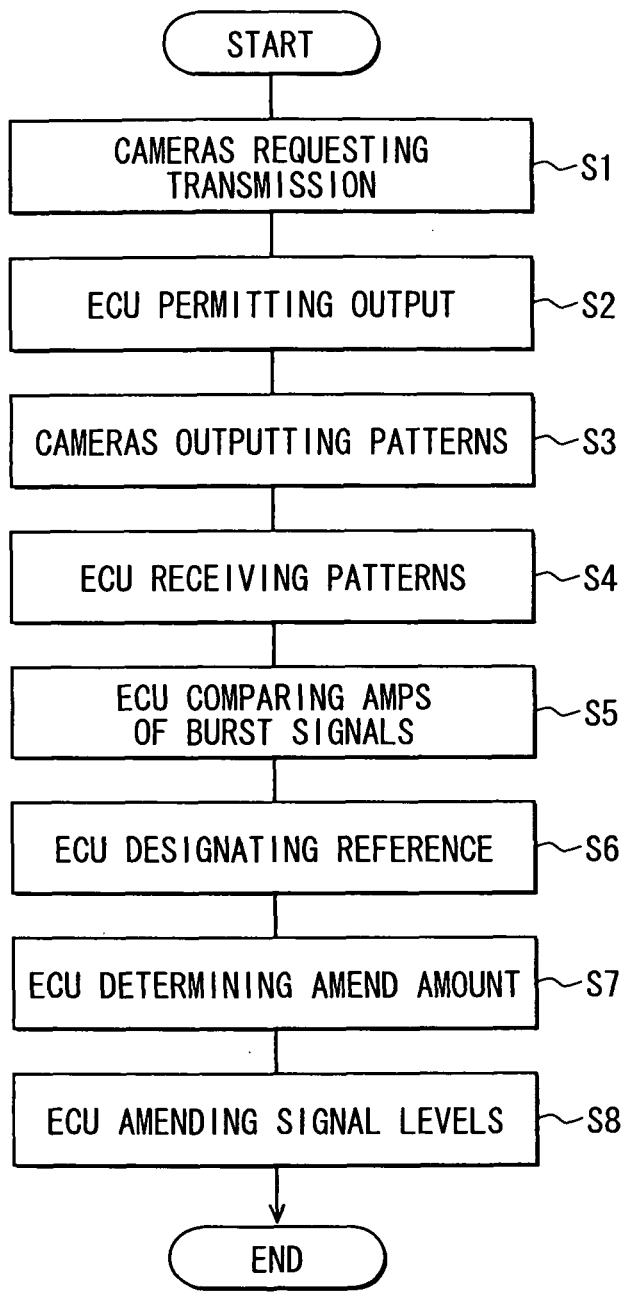
FIG. 5 is a flowchart illustrating a video signal amendment process in the vehicle circumference monitor apparatus.

The following explains an operation flow in the vehicle circumference monitor apparatus 100 with respect to the amendments of the video signals of the cameras 1a to 1d with reference to FIG. 5. FIG. 5 is a flowchart illustrating a video signal amendment process in the vehicle circumference monitor apparatus 100. It is noted that the present process is started when the power source of the vehicle circumference monitor apparatus 100 is turned into an ON state, i.e., when the ignition switch of the subject vehicle is turned into an ON state.

It is further noted that a flowchart or the processing of the flowchart in the present application includes sections (also referred to as steps), which are represented, for instance, as S1. Further, each section can be divided into several subsections while several sections can be combined into a single section. Furthermore, each of thus configured sections can be referred to as a means or unit and achieved not only as a software device but also as a hardware device.

First, at S1, a video signal transmission request is made which confirms whether the cameras 1a to 1d are allowed to output the video signals to the circumference monitor ECU 4 via the signal cables 5; then the processing advances to S2. At S2, at the time when the circumference monitor ECU 4 comes to be in the state to be able to accept the video signals A to D from the cameras 1a to 1d, the circumference monitor ECU 4 sends a transmission permission notice to the cameras 1a to 1d via the signal cables 5a to 5d to permit the output of the video signals A to D. The processing then moves to S3.

At S3, the cameras 1a to 1d output the analog video signals of test patterns to the circumference monitor ECU 4 via the signal cables 5a to 5d. The processing then moves to S4. At S4, the video signal acquisition section 41 of the circumference monitor ECU 4 receives the analog video signal (i.e., each of the analog-state video signals A to D) of the test pattern of each camera 1a to 1d. The processing then moves to S5.

At S5, the signal level estimation section 42 of the circumference monitor ECU 4 compares the amplitude values of the burst signals (for example, color burst signals) of the analog-state video signals A to D with each other. The processing then moves to S6. At S6, the signal level estimation section 42 of the circumference monitor ECU 4 assigned the reference value to the greatest amplitude value of the burst signals as the result of the comparison at S5, and designates, as a reference camera, the camera which outputs the burst signal the amplitude value of which is used as the reference value. The processing then moves to S7.

At S7, the amendment amount determination section 43 determines the amendment amounts, then causing the processing to move to S8. At S8, with respect to the video signals of the cameras 1 other than the reference camera, the signal amplification section 44 of the circumference monitor ECU 4 makes the signal amplification according to the amendment amounts determined at S7 (i.e., the video signals of the cameras 1 other than the reference camera are amended). The present process is then ended.

In the present embodiment, after the cameras 1a to 1d send the video signal transmission requests to the circumference monitor ECU 4 and receives the transmission permission notice from the circumference monitor ECU 4, the cameras 1a to 1d output the analog video signals of the test patterns to the circumference monitor ECU 4. However, there is no need to be limited thereto. For instance, when the power source of the vehicle circumference monitor apparatus 100 is turned into an ON state, the analog video signal of the test pattern may be outputted to the circumference monitor ECU 4 from each of the cameras 1a to 1d.

Returning to FIG. 3. The image processing section 45 has an ND conversion circuit, for example. The image processing section 45 transforms the video signals A to D, which are amplified in the signal amplification section 44 and in the analog state, into the data of the digital signals. Hereinafter, the video signals A to D transformed into the data of the digital signals are referred to as capture images A to D (i.e., digital-state capture images A to D), respectively.

In addition, the image processing section 45 transforms each of the capture images A to D into a bird's eye view image, which is an image on a ground surface viewed when the ground surface is looked down in a perpendicular direction. The bird's eye view image is obtained as image data of a ground surface coordinate system, which is a coordinate system on a road surface, while designating the installation position of each of the cameras 1a to 1d as a respective viewpoint, by using a well-known coordinate transformation equation. Thus, the image processing section 45 may be referred to as a bird's-eye view transformation section. Hereinafter, the bird's-eye view images acquired by transforming the capture images A to D are referred to as bird's-eye view images A to D, respectively. Furthermore, in the image processing section 45, a required image processing such as lens distortion correction may be first applied to the capture images A to D, which may be then transformed into the bird's-eye view images.

The image combination section 46 applies a rotation movement and a parallel movement to each of the bird's-eye view images A to D which are obtained in the image processing section 45 so as to dispose them on a single coordinate plane (i.e., dispose the images A to D so as to be seen as a single image) by using a well-known transformation equation, thereby generating or synthesizing a composite image which combines the bird's-eye view images A to D. Further, when generating the above composite image, the image combination section 46 operates as follows: (i) reading out an image of a track (for example, an image of a computer graphic illustrating the track) stored in a memory device (unshown); (ii) arranging the read image in a point corresponding to the position of the track; and (iii) combining the track image with the bird's-eye view images A to D. Then, the image combination section 46 sends drawing data of the generated composite image to the display device 2 to display the relevant composite data.

It is noted that there may be a case that the cameras 1a to 1d cannot capture images in the whole of the surrounding areas. In such a case, a bird's-eye view image acquired in the past by the cameras 1a to 1d (hereinafter, called a history image) may be used for an image which is not viewed presently by the cameras 1a to 1d, thereby enabling the synthesis of the bird's-eye view image entirely surrounding the track. In this case, the motion of the track may be acquired accurately; the history image may be added to the bird's-eye view images A to D according to the acquired motion of the track, thereby performing the combination of the images. In addition, the motion of the track may be understood by extracting a motion vector using a pattern matching in the image processing and the various sensors such as a vehicle velocity sensor, a steering sensor, and a gyroscope.

The above configuration enables the following. A deviation among the video signals A to D may arise in respect of a signal level due to a difference in the attenuation among the analog signals. The difference in attenuation is caused by a difference in length among the signal cables 5a to 5d. Even if such a deviation arises, the video signals A to D can be amended to make uniform the signal levels with sufficient accuracy by amplifying the video signals A to D based on the amendment amounts, which are determined so as to make uniform the differences of the amplitude values of the burst signals of the respective video signals A to D. Thus, the composite image which combines the bird's-eye view images A to D originating from the cameras 1a to 1d can be displayed in the display device 2 so as to help prevent the deterioration of the appearance due to the difference in color definition among the bird's-eye view images A to D.

Figure 6A:
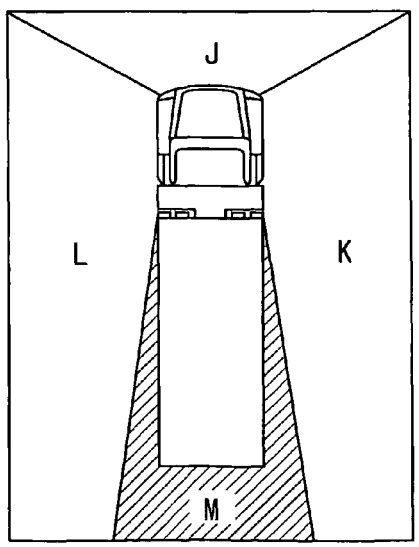
FIG. 6A is a schematic diagram, as a comparative example, for explaining a composite image in cases that the present embodiment is not applied.
Figure 6B:
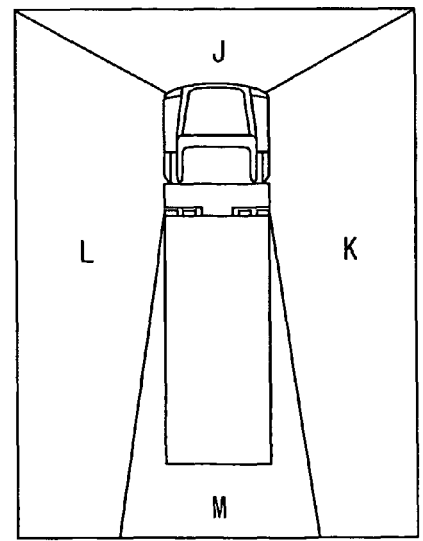
FIG. 6B is a schematic diagram for explaining a composite image according to the present embodiment.

The following explains an effect of the present embodiment specifically using FIG. 6A and FIG. 6B. FIG. 6A is a schematic diagram, as a comparative example, for explaining a composite image in cases that the present embodiment is not applied. In contrast, FIG. 6B is a schematic diagram for explaining a composite image according to the present embodiment. In addition, in FIG. 6A and FIG. 6B, J illustrates a region corresponding to the bird's-eye view image A in the composite image, K illustrates a region corresponding to the bird's-eye view image B in the composite image, L illustrates a region corresponding to the bird's-eye view image C in the composite image, and M illustrates a region corresponding to the bird's-eye view image D in the composite image.

According to an example illustrated in FIG. 2, the length of the signal cable 5d which connects the circumference monitor ECU 4 and the rear camera 1d is significantly great as compared with the lengths of the other three signal cables 5a to 5c which connect the circumference monitor ECU 4 with the cameras 1a, 1b, and 1c, respectively. Attenuation in the analog signal via the signal cable 5 thereby becomes remarkable with respect to the video signal D as compared with video signals A to C. Therefore, when the video images A to D are transformed, without executing the above-mentioned amendment, into the bird's-eye view images A to D, and the composite image which combines the bird's-eye view images A to D is displayed in the display device 2, the color definition of the bird's-eye view image D in the region M is significantly inferior to those of the bird's-eye view images A to C in the regions J to K. The appearance of the composite image is degraded as illustrated in FIG. 6A.

In contrast, according to the vehicle circumference monitor apparatus 100 of the present embodiment, after making uniform the signal levels by executing the above-mentioned amendment, the video images A to D are transformed into the bird's-eye view images A to D, which are combined to generate a composite image; the generated composite image is then displayed in the display device 2. As illustrated in FIG. 6B, the deviation in the color definition among the bird's-eye view images A to D in the regions J to M thus does not arise; thereby, the deterioration in the appearance of the composite image can be suppressed.

In the above configuration of the present embodiment, each of the cameras 1a to 1d does not include a component which executes an ND conversion of a video signal while the circumference monitor ECU 4 includes the component which executes the ND conversion of a video signal. Thus, the cost of the above configuration of the present embodiment can be reduced in comparison with a cost of a configuration in which the component executing the ND conversion of the video signal is included in each of the cameras 1a to 1d. Furthermore, each camera does not need to include a component executing the ND conversion of the video signal; the miniaturization of the cameras 1a to 1d becomes easier.

As a result, while making easier miniaturization of the cameras 1a to 1d and suppressing the cost more, the deterioration of the appearance of the composite image generated by combining the bird's-eye view images A to D originating from the cameras 1a to 1d is suppressed to increase a commodity value.

In addition, the vehicle circumference monitor apparatus 100 according to the present embodiment may be suitably applied to or used in a track, which a carrier body can be attached to and detached from, for a use mode in which the combination of the cameras 1a to 1d to be used is changed according to the presence or absence of a carrier body. In the above use mode in which the combination of the cameras 1a to 1d is changed according to the presence or absence of the carrier body, when the carrier body is used, the rear camera out of the four front, rear, right side, and left side cameras for the circumference monitor is attached to a rear portion of the carrier body; in contrast, when the carrier body is not used, the rear camera is attached to a position at the rear of the driver seat.

The following explains a conventional technology. For instance, there is a case that the combination of the cameras 1a to 1d or the cameras arrangement 1 to be used is changed according to the presence or absence of the carrier body, and the length of the signal cable which connects a circumference monitor camera and a circumference monitor ECU is also changed. In such a case, the following seems to be necessary to suppress the deterioration in the appearance of the composite image. That is, two kinds of parameters for amendments of the video signals are previously stored in association with the presence or absence of the carrier body; according to the presence or absence of the carrier body, those two kinds of parameters are selectively used properly. In this regard, however, in the foregoing configuration, a component needs to be included which acquires the information on the presence or absence of the carrier body; simultaneously, an additional work needs to be done which specifies two kinds of parameters with respect to each of the different vehicle models having different lengths of the signal cables connecting the circumference monitor ECU with the circumference monitor camera.

In contrast, the vehicle circumference monitor apparatus 100 of the present embodiment is configured to make uniform the signal levels of the video signals originating from respective in-vehicle cameras, based on the amplitude values of the burst signals of the analog-state video signals which the circumference monitor ECU 4 actually receives from the cameras for the circumference monitor, enabling the suppression of the deterioration of the appearance of the composite image. Thus, any component which acquires the information on the presence or absence of the carrier body is unnecessary, and any additional work is unnecessary to designate and store a parameter for the amendment of the video signal for every kind of a vehicle model. Therefore, the vehicle circumference monitor apparatus 100 is excellent in general-purpose properties.

Furthermore, in the mode in which the number and installation positions of cameras for circumference monitor are fixed in a vehicle, the suppression of the deterioration of the appearance of the composite image may be also achieved by previously storing the parameters for the amendment of the video signals according to the length of the signal cable which connects each camera with the circumference monitor ECU. In this regard, however, an additional work needs to be done which specifies two kinds of parameters with respect to each of the different vehicle models having different lengths of the signal cables connecting the circumference monitor ECU with the circumference monitor camera.

In contrast, as explained above, according to the vehicle circumference monitor apparatus 100 of the present embodiment, the signal levels of the video signals originating from respective in-vehicle cameras are made uniform based on the amplitude value of the burst signal of the analog video signal which the circumference monitor ECU 4 actually receives from each camera for circumference monitor, enabling the suppression of the deterioration of the appearance of the composite image. Thus, any additional work is unnecessary to designate and store the parameter for the amendment of the video signal for every kind of a vehicle model. With respect to this point, the vehicle circumference monitor apparatus 100 is therefore excellent in general-purpose properties.

In the above configuration, the video signals A to D are amplified in the signal amplification section 44 of the circumference monitor ECU 4, executing the amendment which makes uniform the signal levels of video signals A to D. Thus, it is not necessary to provide the means for amplifying the video signal to each camera, respectively. Therefore, the cost which provides the means for amplifying the video signals in the whole of to vehicle circumference monitor apparatus 100 can be held down. In addition, it is not necessary to provide any circuit for amplifying the video signals in the in-vehicle cameras 1a to 1d or the circumference monitor ECU 4; thus, the costs can be held down also. In addition, it is not necessary to provide any circuit for amplifying the video signals in the in-vehicle cameras 1a to 1d; thus, the configuration of the camera 1a to 1d can be simplified, making it easier to use an existing camera. Further, under the above configuration, the flexibility in use of the apparatus becomes higher.

Further, the above-mentioned amendment amount is determined by using the analog signal in the blanking period of the video signal. The analog signal in the blanking period is a signal preceding the signals representing image information, such as a synchronization signal and a burst signal. This enables the following: before displaying the image which image information actually illustrates, the amendment amount is earlier determined so as to make uniform the signal levels of the video signals A to D originating from the cameras 1a to 1d, enabling the display of the composite image the deterioration of which is suppressed in the appearance.

In the present embodiment, the video signals A to D are amplified in the signal amplification section 44 of the circumference monitor ECU 4 so as to execute an amendment to make uniform the signal levels of the video signals A to D. However, there is no need to be limited thereto. For example, the video signals A to D may be amplified in the cameras 1a to 1d so as to execute an amendment to make uniform the signal levels of the video signals A to D.

Figure 7:
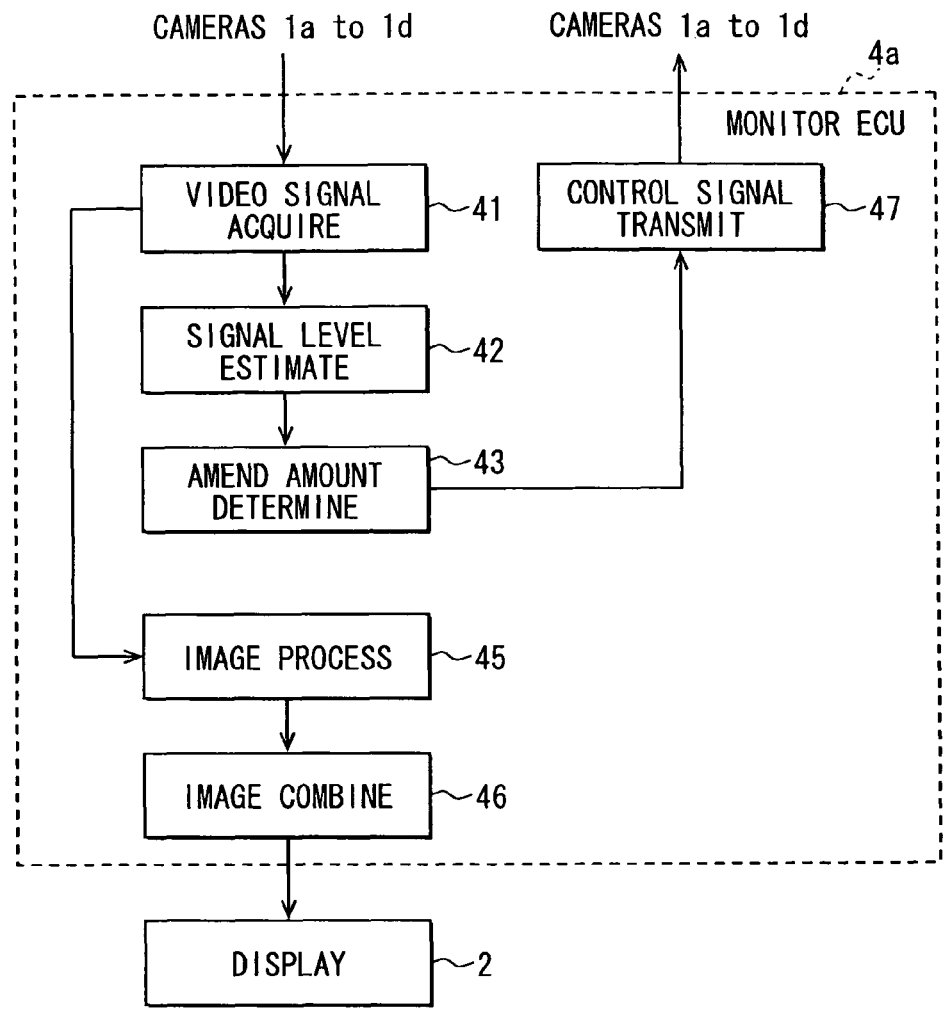
FIG. 7 is a block diagram illustrating a configuration of another circumference monitor ECU in a first modification according to the present embodiment, in the cases that amendment is made in the camera.
Figure 8:
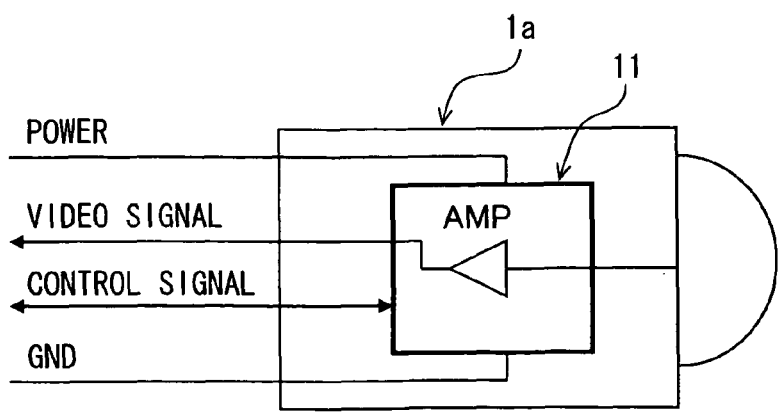
FIG. 8 is a diagram illustrating a schematic configuration of a front camera in the first modification in the cases that amendment is made in the camera.

The following explains another configuration as a first modification of the foregoing embodiment with reference to FIG. 7 and FIG. 8. FIG. 7 is a block diagram illustrating a schematic configuration of a circumference monitor ECU 4a, as the first modification of the foregoing embodiment, in cases that the cameras 1a to 1d amend the video signals A to D. FIG. 8 is a diagram illustrating a schematic configuration of a front camera, as the first modification of the foregoing embodiment, in the case that amendment is made in the camera. To simplify the explanation of the present first modification, an element or component having the same function as that of the element or component explained in the foregoing embodiment is assigned with the same reference number as that in the foregoing embodiment and omitted from the following explanation.

The following explains an outline configuration of the circumference monitor ECU 4a with reference to FIG. 7. As illustrated in FIG. 7, the circumference monitor ECU 4a includes the following: the video signal acquisition section 41, the signal level estimation section 42, the amendment amount determination section 43, the image processing section 45, an image combination section 46, and a control signal transmission section 47. It is noted that the circumference monitor ECU 4a has a configuration identical to that of the circumference monitor ECU 4 except that the signal amplification section 44 is not included and the control signal transmission section 47 is included.

The amendment amount determination section 43 of the circumference monitor ECU 4a generates control signals for amplifying the video signals A to D according to the respective determined amendment amounts, and transmits the generated control signals to the cameras 1a to 1d via the control signal transmission section 47. More specifically, the control signal for amplifying the video signal A is sent to the front camera 1a; the control signal for amplifying the video signal B is sent to the right side camera 1b; the control signal for amplifying the video signal C is sent to the left side camera 1c; further, the control signal for amplifying the video signal D is sent to the rear camera 1d. It is noted that a configuration of the above transmission can be achieved such that the control signal transmission section 47 transmits to the cameras 1a to 1d via the signal cables 5a to 5d.

The image processing section 45 of the circumference monitor ECU 4a transforms, into the digital-state data, the analog-state video signals A to D, which were amplified by the cameras 1a to 1d according to the control signals transmitted from the control signal transmission section 47; it then transforms the digital-state data into the bird's-eye view images.

The following explains a schematic configuration of the front camera 1a in the case that amendment is made in the camera. As illustrated in FIG. 8, the front camera 1a contains a control unit 11. It is noted that the control unit 11 is connected to a power source and GND.

The control unit 11 has an imaging element such as a CCD element and transforms, into an analog video signal, a light which is received by the imaging element via a wide-angle lens. In addition, when a control signal for amplifying the video signal A according to the amendment amount is transmitted from the control signal transmission section 47 of the circumference monitor ECU 4a, the control unit 11 receives the control signal. According to this control signal, the control unit 11 amplifies using an amplifier (AMP) the analog video signal (i.e., analog-state video signal A), which is acquired by transformation with the imaging element. The control unit 11 outputs the analog video signal amplified by the AMP to the circumference monitor ECU 4a via the signal cable 5a. Therefore, the control unit 11 may be referred to as a camera-side amplification section.

It is noted that before the time when the above-mentioned control signal is transmitted from the control signal transmission section 47, the control unit 11 outputs directly the analog video signal acquired by the transformation with the imaging element, to the circumference monitor ECU 4a via the signal cable 5a, without amplifying it using the AMP.

In addition, the above explanation is made as an example using the front camera 1a. Similarly, with respect to the cameras 1b to 1d, the analog video signal is amplified according to the control signal transmitted from the control signal transmission section 47, thereby amending the signal levels of the analog-state video signals A to D to become uniform.

In the foregoing embodiment, the amplitude value of the burst signal is used for the signal level estimation section 42 to estimate the difference among the video signals A to D. However, there is no need to be limited thereto. For example, another alternative configuration may use a amplitude value of an analog signal other than the burst signal in the blanking period, such as a synchronization signal; further, another configuration may use an amplitude value (for example, a maximum amplitude value, an average value of amplitude values) representing image information such as a brightness signal, a color signal. Further, a signal amplitude level may include an amplitude value, a maximum amplitude value, an average value of amplitude values.

Further, in the foregoing embodiment, the signal level estimation section 42 estimates a difference in signal level among the video signals A to D; the amendment amount determination section 43 determines an amendment amount based on the result of the estimation. However, there is no need to be limited thereto. For example, based on the amplitude values of the burst signals of the video signals A to D acquired by the video signal acquisition section 41, the amendment amount determination section 43 may determine an amendment amount with reference to a predetermined table.

Figure 9:
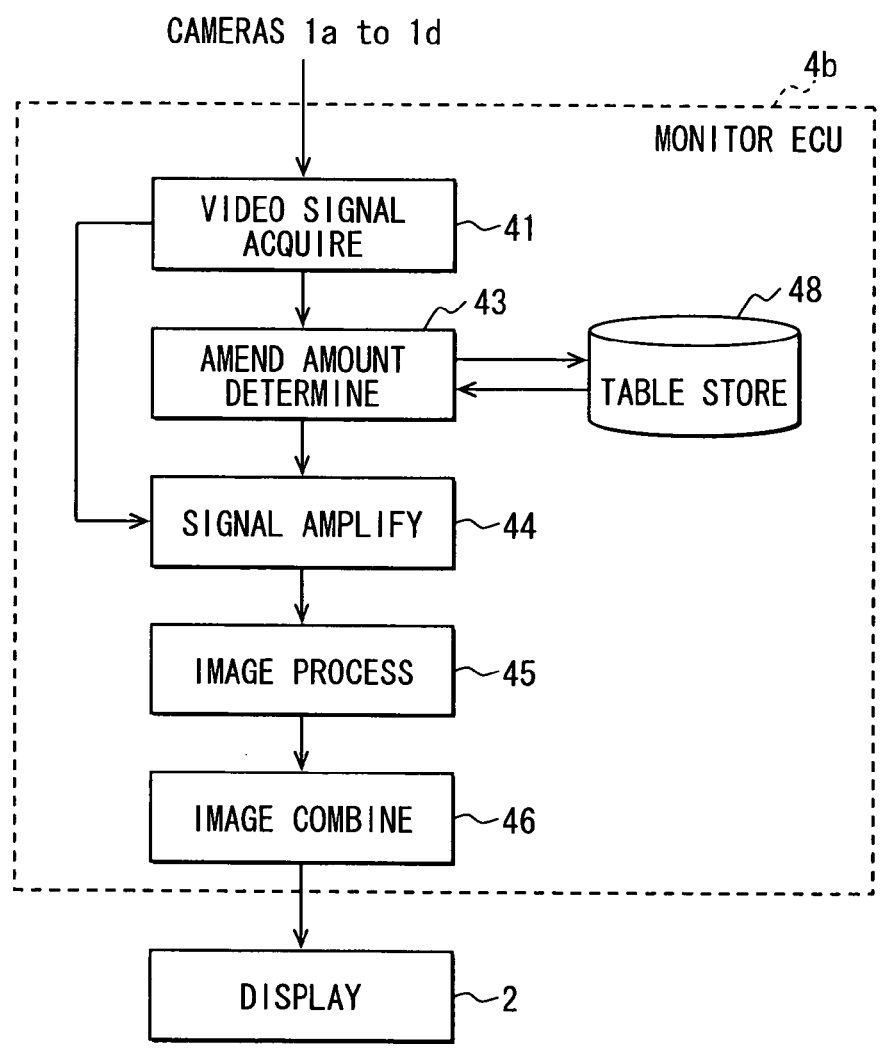
FIG. 9 is a block diagram illustrating a configuration of yet another circumference monitor ECU in a second modification according to the present embodiment.

The above configuration is explained with reference to FIG. 9 as a second modification according to the embodiment. FIG. 9 is a block diagram illustrating a schematic configuration of a circumference monitor ECU 4b in the second modification (i.e., in cases that an amendment amount is determined using a table). To simplify the explanation of the present modification, an element or component having the same function as that of the element or component explained in the foregoing embodiment is assigned with the same reference number as that in the foregoing embodiment and omitted from the following explanation.

As illustrated in FIG. 9, the circumference monitor ECU 4b includes the video signal acquisition section 41, the amendment amount determination section 43, the signal amplification section 44, the image processing section 45, the image combination section 46, and a table storage section 48. It is noted that the circumference monitor ECU 4b has a configuration identical to that of the circumference monitor ECU 4 except that the signal level estimation section 42 is not included and the table storage section 48 is included.

The table storage section 48 stores a table which previously associates an amplitude value of a burst signal with an amendment amount. It is noted that the table associates an amplitude value of a burst signal with an amendment amount such that the smaller the amplitude value of the burst signal is, the larger the amendment amount (i.e., an amplification amount of a video signal) is. More specifically, the association is made such that as the amendment amount is small, the amplitude value of the burst signal is large in inverse proportion; the differences in attenuation degree among the video signals A to D of the cameras 1a to 1d can be made up by the amendment amounts.

The amendment amount determination section 43 of the circumference monitor ECU 4b refers to the above table stored in the table storage section 48 based on the amplitude values of the burst signals of the video signals A to D acquired in the video signal acquisition section 41, and determines an amendment amount according to the amplitude value.

In the present modification, the table stored in the table storage section 48 is referred to using the amplitude value of the burst signal. However, there is no need to be limited thereto. For example, another alternative configuration may use a amplitude value of an analog signal other than the burst signal in the blanking period, such as a synchronization signal. another configuration may use an amplitude value (for example, a maximum amplitude value, an average value of amplitude values) showing image information such as a brightness signal, a color signal.

Further, in the foregoing embodiment, the ON and OFF manipulations of the assist start switch 3 cause the circumference monitor control to start and stop, respectively. However, there is no need to be limited thereto. For example, suppose the case that the circumference monitor control is started at the time of back parking. In this case, the circumference monitor ECU 4 may start the circumference monitor control when determining that the shift position becomes at a reversed "R" under a predetermined velocity (for example, 10 km/h), based on the velocity of the subject vehicle detected by the vehicle velocity sensor or the vehicle wheel velocity sensor and the shift position detected by the shift position sensor. In addition, the circumference monitor control may be stopped when determining that the shift position becomes at the parking "P."

Further, suppose the case that the circumference monitor control is started at the time of turning right/left or changing traffic lanes. In this case, when the predictive information on turning right/left or changing traffic lanes is detected by a winker switch, the circumference monitor control may be started. In addition, in such a case, when it is detected that the winker switch is turned off, the circumference monitor control may be stopped.

Further, suppose the case that the circumference monitor control is started at the time of starting-off from the parking lot. In this case, when it is detected that the shift position is switched into the drive "D" or reverse "R" from the parking "P" by the shift position sensor, the circumference monitor control may be started. In addition, in such a case, when the velocity of the subject vehicle detected by the vehicle velocity sensor or the vehicle wheel velocity sensor becomes greater than a predetermined velocity (for example, 10 km/h), the circumference monitor control may be stopped.

In the foregoing embodiment, the case that the vehicle circumference monitor apparatus 100 is mounted in a track is explained as an example. Without need to be limited thereto, it can be mounted in a vehicle other than the track.

Now, the problem may be defined as follows. The differences in length among the signal cables 5a to 5d transmitting analog-state video signals result in deviations in attenuation degree among the analog-state video signals. Such deviations result in differences in color definition among the images originating from the cameras 1a to 1d. Such differences are defined as the problem. It is noted that such a problem arises more significantly as the size of the vehicle becomes larger to cause the installation positions of the cameras to be separated farther from each other. It is thereby more desirable that the vehicle circumference monitor apparatus 100 is mounted in a large-sized vehicle.

For instance, if the vehicle circumference monitor apparatus 100 according to the present embodiment is mounted in a middle-sized vehicle larger than a standard-sized vehicle, an effect of suppressing the deterioration of the appearance of the composite image formed by combining the images originating from the individual in-vehicle cameras 1a to 1d becomes more remarkable. It is thereby more desirable that the vehicle circumference monitor apparatus 100 is mounted in a middle-sized vehicle, such as a minibus, larger than a standard-sized vehicle. In addition, if the vehicle circumference monitor apparatus 100 is mounted in a large-sized vehicle such as a track and a motor coach (i.e., bus), an effect of suppressing the deterioration of the appearance of the composite image formed by combining the images originating from the individual in-vehicle cameras 1a to 1d becomes much more remarkable. It is thereby much more desirable that the vehicle circumference monitor apparatus 100 is mounted in a large-sized vehicle. It is noted that the above mentioned standard-sized vehicle, middle-sized vehicle, and large-sized vehicle may be classifications of vehicles in a road traffic law in each nation.

Further, in the foregoing embodiment, several images of camera coordinate system are transformed into bird's-eye view images; the bird's-eye view images are combined to generate a composite image; the generated composite image is displayed in the display device 2. However, there is no need to be limited thereto. For example, several images of the camera coordinate system may be combined, without changing into the bird's-eye view image, to generate a composite image; the generated composite image may be thus displayed in the display device 2.

Further, in the foregoing embodiment, the cameras 1a to 1d use color cameras of NTSC system. However, there is no need to be limited thereto. For example, color cameras of another system may be used; alternatively, monochrome cameras may be used.

Further, in the foregoing embodiment, the vehicle circumference monitor apparatus 100 is provided with four cameras 1a to 1d. Without need to be limited thereto, the vehicle circumference monitor apparatus 100 may have another configuration to have the cameras arrangement 1 having cameras, the number of which is other than four.

Each or any combination of processes, functions, sections, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a non-transitory computer-readable storage media or can be downloaded and stored in a non-transitory computer-readable storage media via a communications network.

Aspects of the disclosure described herein are set out in the following clauses.

As an aspect of the disclosure, a vehicle circumference monitor apparatus in a vehicle provided as follows. A plurality of in-vehicle cameras are arranged such that at least a part of a capture target of one in-vehicle camera does not overlap with a capture target of an other camera. Each of the in-vehicle cameras captures an image of a vehicle circumferential area outside of the vehicle and outputs an analog-state video signal of the captured image via a corresponding signal cable. An electronic control unit is included to have an image combination section to generate a composite image by a combination to combine images originating from the in-vehicle cameras based on video signals inputted via the signal cables from the in-vehicle cameras. A display device is, included to display the composite image generated by the image combination section. Herein, the electronic control unit further includes an amendment amount determination section to determine an amendment amount with respect to the analog-state video signal originating from each of the in-vehicle cameras based on analog signals included in the analog-state video signals inputted via the signal cables from the in-vehicle cameras, in order to make uniform signal levels of the analog-state video signals originating from the respective in-vehicle cameras.

Further, as an optional aspect of the disclosure, the video signal may be amplified by the electronic control unit; thereby, it is not necessary to provide each in-vehicle camera with the means for amplifying the video signal each. Therefore, the cost which provides the means for amplifying the video signals in the whole apparatus can be held down. In addition, it is not necessary to provide each in-vehicle camera or the electronic control unit with any circuit for amplifying the video signals in each in-vehicle camera; thus, the costs can be held down also. In addition, it is not necessary to provide each in-vehicle camera with any circuit for amplifying the video signals in each in-vehicle camera; thus, the configuration of the camera or camera unit can be simplified more, making easier to use an existing camera. Further, under the above configuration, the flexibility of the apparatus becomes higher.

As an optional aspect of the disclosure, the electronic control unit may transmit a control signal to each in-vehicle camera; the control signal is used to amplify a video signal, which is to be outputted via the corresponding signal cable from each in-vehicle camera, according to the amendment amount determined by the amendment amount determination section. The video signal is thus amplified in the in-vehicle camera, thereby making uniform the signal levels of the video signals outputted via the signal cables from the several in-vehicle cameras.

The disadvantage of the difference in definition among the several images, which originate from the several in-vehicle cameras, arises from the variation in attenuation of the analog-state video signals resulting from the difference in length among the signal cables which send the video signals. Such a disadvantage arises more significantly as the size of the vehicle becomes larger to cause the installation positions of the cameras to be separated farther from each other. As an optional aspect of the disclosure, if the vehicle circumference monitor apparatus may mounted in a vehicle larger than a standard-sized vehicle, an effect of suppressing the deterioration of the appearance of the composite image formed by combining the images originating from the several in-vehicle cameras becomes more remarkable.

Furthermore, if the vehicle circumference monitor apparatus according is mounted in a large-sided vehicle, an effect of suppressing the deterioration of the appearance of the composite image formed by combining the images originating from the several in-vehicle cameras becomes much more remarkable.

Further, as an optional aspect of the disclosure, the electronic control unit may include a bird's-eye view transformation section which transforms an image, which is represented by a video signal inputted via a signal cable from an in-vehicle camera, into a bird's-eye view image which is an image on a ground level glanced down perpendicularly from an upper position. The image combination section may combine the bird's-eye view images, which originate from the several in-vehicle cameras and obtained by the bird's-eye view transformation section to generate or synthesize a composite image.

In order to make uniform the signal levels of the video signals originating from respective in-vehicle cameras, an amendment amount is determined with respect of each video signal' originating from each in-vehicle camera based on analog signals inputted via the cables from several in-vehicle cameras. Such an amendment amount may be determined in the following manners, for instance.

As an optional aspect of the disclosure, the electronic control unit may estimate the difference in signal level among the video signals originating from the respective in-vehicle cameras based on analog signals inputted via the cables from several in-vehicle cameras, and determine the amendment amount based on the estimated difference in signal level.

Further, in the above, a reference signal level may be defined as the largest signal level among those of the respective analog signals inputted via the signal cables from the several in-vehicle cameras. The difference from the reference signal level may be calculated for each of the signal levels of the analog signals inputted via the corresponding signal cables from the several in-vehicle cameras. The calculated difference may be estimated as a difference in signal level of the video signal originating from each in-vehicle camera; the amendment amount may be determined according to the calculated above difference.

Furthermore, as an optional aspect of the disclosure, the electronic control unit may include a table storage section which stores a table which previously associates the amendment amount and the signal level of the analog signal inputted via the signal cable from each of the several in-vehicle cameras. The amendment amount determination section may refer to the table stored in the table storage section based on analog signals inputted via the cables from several in-vehicle cameras, thereby determining the amendment amount.

Further, as an optional aspect of the disclosure, the above-mentioned amendment amount may be determined using an analog signal in the blanking period of the video signal. The analog signal in the blanking period may be a signal such as a synchronization signal or a burst signal, which precedes a signal for expressing an image. Thus, before actually displaying the composite image, the amendment amount can be determined and the video signal originating from each in-vehicle camera can be amended. This enables the display of the composite image the deterioration of which is suppressed in the appearance.

In the above, the burst signal may be used as an analog signal in the blanking period. The amendment amount may be thereby determined to make uniform the signal levels of the video signals originating from the respective in-vehicle cameras.

It will be obvious to those skilled in the art that various changes may be made in the above-described embodiments of the present invention. However, the scope of the present invention should be determined by the following claims.

What is claimed:

1. A vehicle circumference monitor apparatus in a vehicle, the apparatus comprising:
   a plurality of in-vehicle cameras arranged such that at least a part of a capture target of one in-vehicle camera does not overlap with a capture target of an other camera,
       each of the in-vehicle cameras capturing an image of a vehicle circumferential area outside of the vehicle and outputting an analog-state video signal of the captured image via a corresponding signal cable;
   an electronic control unit including an image combination section to generate a composite image by a combination to combine images originating from the in-vehicle cameras based on video signals inputted via the signal cables from the in-vehicle cameras; and
   a display device to display the composite image generated by the image combination section,
   the electronic control unit further including
       an amendment amount determination section to determine an amendment amount with respect to the analog-state video signal originating from each of the in-vehicle cameras based on analog signals included in the analog-state video signals inputted via the signal cables from the in-vehicle cameras, in order to make uniform signal levels of the analog-state video signals originating from the respective in-vehicle cameras,
   wherein
   the electronic control unit further includes a signal level estimation section to estimate a difference in signal level among video signals originating from the in-vehicle cameras based on analog signals inputted via the signal cables from the in-vehicle cameras; and
   the amendment amount determination section determines an amendment amount with respect to a video signal originating from each of the in-vehicle cameras based on the difference in signal level estimated by the signal level estimation section, in order to make uniform the signal levels of the analog-state video signals originating from the in-vehicle cameras.

2. The vehicle circumference monitor apparatus according to claim 1, wherein:
   the electronic control unit further includes a unit-side amplification section to amplify the analog-state video signals inputted via the signal cables from the in-vehicle cameras to acquire analog-state uniformed video signals, based on the amendment amounts determined by the amount determination section; and the image combination section generates the composite image by the combination based on the analog-state uniformed video signals which are acquired by the unit-side amplification section.

3. The vehicle circumference monitor apparatus according to claim 1, wherein:

the electronic control unit further includes a control signal transmission section to transmit a control signal to each of the in-vehicle cameras, the control signal being used to amplify the analog-state video signal, which is to be outputted via the corresponding signal cable from each of the in-vehicle cameras, according to the amendment amount determined by the amendment amount determination section;

each of the in-vehicle cameras further includes a camera-side amplification section to amplify the analog-state video signal according to the control signal sent from the control signal transmission section to make uniform the signal levels of the analog-state video signals, acquiring analog-state uniformed video signal which is to be outputted via the signal cables from the several in-vehicle cameras; and the image combination section generates the composite image by the combination based on the analog-state uniformed video signals which are acquired in the camera-side amplification sections in the in-vehicle cameras.

4. The vehicle circumference monitor apparatus according to claim 1, being mounted in a vehicle larger than a standard-sized vehicle.

5. The vehicle circumference monitor apparatus according to claim 4, being mounted in a large-sized vehicle.

6. The vehicle circumference monitor apparatus according to claim 1, wherein:

the electronic control unit further includes a bird's-eye view transformation section to transform an image, which is represented by a video signal inputted via the signal cable from the in-vehicle camera, into a bird's-eye view image which indicates an image on a ground surface looked down perpendicularly;

the image combination section combines the bird's-eye view images, which originate from the in-vehicle cameras and are obtained by the bird's-eye view transformation section, to generate a composite image.

7. The vehicle circumference monitor apparatus according to claim 1, wherein:

the signal level estimation section (i) defines a reference signal level as a largest signal amplitude level among signal levels of analog signals inputted via the signal cables from the in-vehicle cameras, (ii) calculates a difference from the reference signal level for each of the signal levels of the analog signals inputted via the signal cables from the in-vehicle cameras, and (iii) estimates the calculated difference as a difference of the signal level of the video signal originating from each of the in-vehicle cameras; and the amendment amount determination section determines the amendment amount according to the difference calculated in the level estimation section.

8. The vehicle circumference monitor apparatus according to claim 1, wherein the amendment amount determination section determines an amendment amount with respect to an analog-state video signal originating from each of the in-vehicle cameras for making uniform signal levels of the analog-state video signals originating from the in-vehicle cameras, based on an analog signal in a blanking period included in the analog-state video signal inputted via the signal cable from each of the in-vehicle cameras.

9. The vehicle circumference monitor apparatus according to claim 8, wherein the amendment amount determination section determines an amendment amount with respect to an analog-state video signal originating from each of the in-vehicle cameras for making uniform signal levels of the analog-state video signals originating from the in-vehicle cameras, based on a burst signal included in the analog-state video signal inputted via the signal cable from each of the in-vehicle cameras.

10. A vehicle circumference monitor apparatus in a vehicle, the apparatus comprising:

a plurality of in-vehicle cameras arranged such that at least a part of a capture target of on in-vehicle camera does not overlap with a capture target of another camera, each of the in-vehicle cameras capturing an image of a vehicle circumferential area outside of the vehicle and outputting an analog-state video signal of the captured image via a corresponding signal cable;

an electronic control unit including an image combination section to generate a composite image by a combination to combine images originating from the in-vehicle cameras based on video signals inputted via the signal cables from the in-vehicle cameras; and a display device to display the composite image generated by the image combination section, the electronic control unit further including a signal level estimation section to estimate a difference in signal level among analog-state video signals originating from the plurality of in-vehicle cameras based on analog signals inputted via the signal cables from the plurality of in-vehicle cameras, and an amendment amount determination section to determine an amendment amount with respect to the analog-state video signal originating from each of the in-vehicle cameras based on the difference in signal level estimated by the signal level estimation section, so that signal levels of the analog-state video signals originating from the respective in-vehicle cameras are made uniform before the image combination section generates the composite image.

11. The vehicle circumference monitor apparatus according to claim 10, wherein:

the signal level estimation section (i) defines a reference signal level as a largest signal amplitude level among signal levels of analog signals inputted via the signal cables from the in-vehicle cameras, (ii) calculates a difference from the reference signal level for each of the signal levels of the analog signals inputted via the signal cables from the in-vehicle cameras, and (iii) estimates the calculated difference as a difference of the signal level of the video signal originating from each of the in-vehicle cameras; and the amendment amount determination section determines the amendment amount according to the difference calculated in the level estimation section.

12. The vehicle circumference monitor apparatus according to claim 10, wherein:

the electronic control unit further includes a unit-side amplification section to amplify the analog-state video signals inputted via the signal cables from the in-vehicle cameras to provide amplified analog-state video signals, based on the amendment amounts determined by the amount determination section, such that signal levels of the amplified analog-state video signals are made uniform; and the image combination section generates the composite image by the combination based on the amplified analog-state video signals which are provide by the unit-side amplification section.

13. The vehicle circumference monitor apparatus according to claim 10, wherein:

the electronic control unit further includes a control signal transmission section to transmit a control signal to each of the in-vehicle cameras, the control signal being used to amplify the analog-state video signal, which is outputted from each of the in-vehicle cameras, according to the amendment amount determined by the amendment amount determination section;

each of the plurality of in-vehicle cameras further includes a camera-side amplification section to amplify an analog-state video signal outputted from each of the in-vehicle cameras according to the control signal sent from the control signal transmission section to provide an amplified analog-state video signal such that signal levels of the amplified analog-state video signals originating from the plurality of in-vehicle cameras are made uniform, when the amplified analog-state video signals are inputted in the electronic control unit via the signal cables; and the image combination section generates the composite image by the combination based on the amplified analog-state video signals which are provided by the camera-side amplification sections in the plurality of in-vehicle cameras.

14. The vehicle circumference monitor apparatus according to claim 10, being mounted in a vehicle larger than a standard-sized vehicle.

15. The vehicle circumference monitor apparatus according to claim 14, being mounted in a large-sized vehicle.

16. The vehicle circumference monitor apparatus according to claim 10, wherein:

the electronic control unit further includes a bird's-eye view transformation section to transform an image, which is represented by a video signal inputted via the signal cable from the in-vehicle camera, into a bird's eye view image which indicates an image on a ground surface looked down perpendicularly;

the image combination section combines the bird's-eye view images, which originate from the in-vehicle cameras and are obtained by the bird's-eye view transformation section, to generate a composite image.

17. The vehicle circumference monitor apparatus according to claim 10, wherein the amendment amount determination section determines an amendment amount with respect to an analog-state video signal originating from each of the in-vehicle cameras for making uniform signal levels of the analog-state video signals originating from the in-vehicle cameras, based on an analog signal in a blanking period included in the analog-state video signal inputted via the signal cable from each of the in-vehicle cameras.

18. The vehicle circumference monitor apparatus according to claim 17, wherein the amendment amount determination section determines an amendment amount with respect to an analog-state video signal originating from each of the in-vehicle cameras for making uniform signal levels of the analog-state video signals originating from the in-vehicle cameras, based on a burst signal included in the analog-state video signal inputted via the signal cable from each of the in-vehicle cameras.

* * * * *